May 4, 1948.  L. DEWAN  2,440,935
GENERATOR FOR PRODUCING PERIODIC CURRENT
Filed Aug. 31, 1944   2 Sheets-Sheet 1

INVENTOR.
Leon Dewan
BY
Edw. S. Higgins
ATTORNEY

May 4, 1948.   L. DEWAN   2,440,935
GENERATOR FOR PRODUCING PERIODIC CURRENT
Filed Aug. 31, 1944   2 Sheets-Sheet 2

INVENTOR.
Leon Dewan
BY
Edw. S. Higgins
ATTORNEY

Patented May 4, 1948

2,440,935

UNITED STATES PATENT OFFICE 2,440,935

GENERATOR FOR PRODUCING PERIODIC CURRENT

Leon Dewan, Arverne, N. Y., assignor of one-half to Percival W. Andrews, New York, N. Y.

Application August 31, 1944, Serial No. 552,035

2 Claims. (Cl. 171—209)

This invention relates to generators for producing periodic current for use in arc welding. In some devices used for arc welding current is brought down to zero many times per second as in alternating current and the arc is viewed through a synchronously revolving shutter that excludes all light from the arc except at the zero periods.

One object of the present invention is to make possible the employment of such generators with direct current.

Another object is the employment of changer-over of existing direct current equipment to be used with such devices by a slight modification of such equipment whereby the direct current arc will be extinguished rapidly and frequently.

Another object is to provide such arc welding apparatus which combines certain advantages of both the alternating current and direct current apparatus.

Another object is to provide such arc welding apparatus with increased flexibility and a new feature comprises a control-over polarity in the arc welding.

These and other objects and advantages will be apparent from the description of the invention to follow.

In the main form of the invention, a counter electromotive force of a rapidly fluctuating or alternating character is introduced into the circuit of the direct current generator whereby in one phase of the fluctuations the direct current is opposed and brought to zero many times per second thus allowing a view of the arc during these zero periods.

It has been found that once the current has been brought to zero the arc does not strike again until the voltage has again risen to a definite point, somewhere around fifteen to twenty volts depending on the nature of the arc electrode and other factors.

It has been found that if the counter electromotive force is allowed to further act on the generator output to reverse the voltage after each zero period to the point where the arc re-strikes a definitely improved welding current is produced. It has been known that alternating current arc welding has certain advantages over direct current welding, namely, a freedom from magnetic arc blow and agitation of the molten pool by the pulsations of the alternating arc resulting in working out of slag particles and improvement in the deposited metal. However its main disadvantages have been a lack of polarity which is usually necessary in heavy or very light work to allow the electrode and the base metal to fuse simultaneously and also the lack of automatic voltage control responding to the change in arc length and conductivity. In this feature of the invention whereby the current is not only caused to pulse and reach zero but to reverse and cause restriking of the arc, some of the advantages of alternating current are acquired including the agitation of the molten pool by pulsation and a certain reduction of the magnetic blow. At the same time, the polarity characteristic of direct current and the automatic voltage control are maintained.

In one form of the invention it is also possible to vary the degree of polarity of this current whereas heretofore with direct current it has only been possible to use "straight" or "reversed" polarity. With very heavy work "straight" polarity (positive on work and negative on electrode) is called for and with very light work "reversed" polarity is needed. However there are intermittent grades of work where neither extreme polarity is satisfactory. According to the present invention, the proportion of the direct current and the alternating counter electromotive force in the welding current may be varied so that the current varies from a series of unidirectional impulses producing an extreme polarity to an alternating current of equal amplitude peaks which gives a neutral polarity.

In the drawings—

Figure 1:
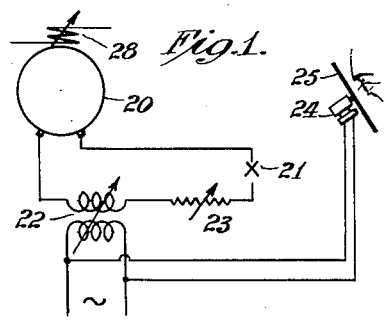
Fig. 1 is a schematic drawing of apparatus embodying one form of the invention.

In Fig. 1, the generator 20 supplies current for the welding arc indicated at 21. The secondary of a variable transformer 22 is connected into the arc circuit together with a variable resistance 23. The alternating current line feeding the primary of transformer 22 also connects to a small synchronous motor 24 which turns a shutter 25.

Figure 2:
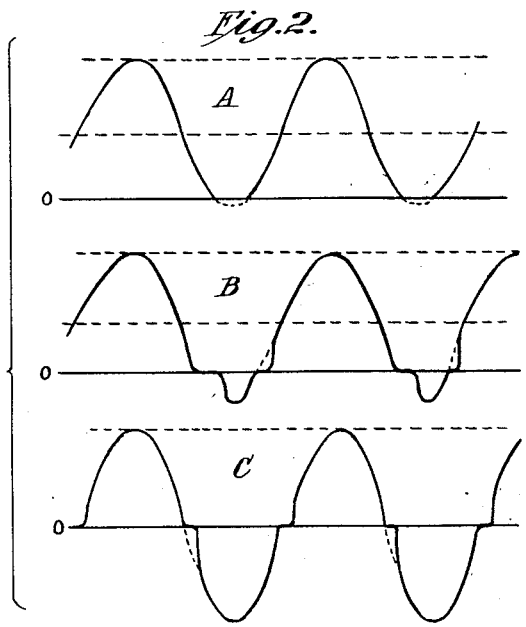
Fig. 2 is a series of graphs descriptive of the welding current that may be produced by the apparatus of Fig. 1.
Figure 5:
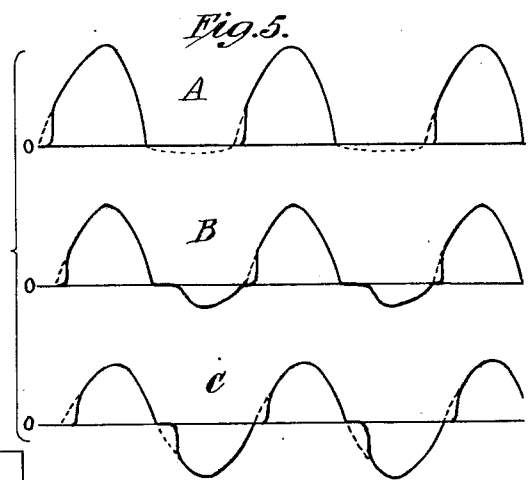
Fig. 5 is a series of graphs illustrating the form of current obtainable by the method of Fig. 4.

The field of the direct current generator and the output of the transformer are variable and controllable as shown to adjust the proportion of alternating current and direct current. If the controls are adjusted so that the proportion of direct current to alternating current is at maximum, the alternating voltage in the transformer secondary opposes the direct current of the generator in half-cycles of one sign to bring the current to zero and helps it in half-cycles of the opposite sign to increase the voltage. This is illustrated in the graph of Fig. 2 at "A" where zero periods are produced. The voltage in this instance drops below zero at each period to create a small surge of the opposite sign but insufficient to restrike the arc. This creates a zero period of ample proportion so that the shutter opening time is easily contained in this period. The motor must be of such synchronous speed as to cause a shutter exposure at each of these periods. With a 60-cycle A. C. current supply there would be 60 views per second.

By increasing the proportion of the A. C. component to the D. C. current, it is possible to obtain a welding current as shown in Fig. 2 "B." The half-cycles of A. C. opposing the D. C. not only bring it to zero but go well beyond so that the arc not only restrikes but is established briefly at each of these half cycles. The result is that this current has the advantage as in alternating current of agitation of the molten pool and working out of slag particles and yet possesses the advantage of polarity as in direct current sufficient for heavy work. There is also a reduction in the magnetic blow.

The proportion of alternating current to direct current may be increased if less polarity is desired, until only alternating current remains as shown in Fig. 2 "C" and the polarity is neutral. The controls of the generator and the transformer may be worked to vary the polarity, keeping the welding amperage constant as the proportion of alternating current to direct current is varied, and the variable resistance 23 may be used for varying the welding amperage. However, the resistance 23 could be dispensed with if the controls of the generator and the transformer are made to work both ways, i. e., in opposition to vary the proportion of alternating current to direct current and in unison to vary the amperage without changing alternating current to direct current proportion.

Where the generator is of the constant potential type supplying several welding operations at the same time, a transformer such as 22 and a resistance 23 may be included in each welding circuit. The transformer in this case can replace the reactors generally used in such installations and a variable resistance used to adjust the amount of direct current.

It is evident that this feature of variable polarity may be applied to any variable output welding transformer by using it as the transformer 22 is used in connection with a direct current generator or a direct current power line with apparatus to vary the direct current output.

Figure 3:
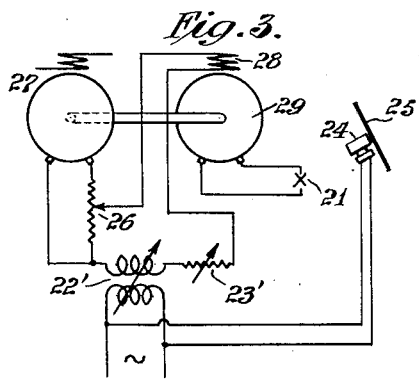
Fig. 3 is a diagram illustrating an application of the method of Fig. 1 to a separately excited generator.

Fig. 3 shows one way of applying the invention to a separately excited direct current generator. The potentiometer 26, at the output of the exciter 27 and the variable transformer 22' are worked together in the same manner as described in connection with the generator and transformer of Fig. 1 to produce any of the currents described in that connection. This current being produced in the field coil 28 of the generator 29 is reflected in the welding output of the generator. The resistance 23' serves the same function as resistance 23 of Fig. 1. It is desirable in this case that the generator 29 have field magnet poles of laminated construction to respond to the rapid pulsations.

Figure 4:
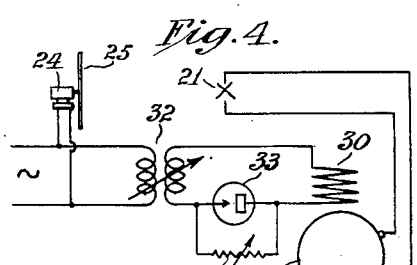
Fig. 4 is a diagram illustrating a modification wherein a rectifying element is used in conjunction with the generator field to produce the desired result.

Fig. 4 shows another method of creating the desired current by modifying the generator field flux. The output of the variable transformer 32 is fed to a field winding of the generator 31 through a rectifier 33. A rheostat controls the amount or proportion of alternating current to direct current in the field circuit. If the resistance of the rheostat is very high, the current in the output of the generator may be as in "A" of Fig. 2, composed of unidirectional pulses separated by equal periods of zero or slight surges of the opposite sign insufficient to restrike an arc. Decrease of the rheostat resistance will cause the output current to reach the form of Fig. 2 indicated as "B" where the arc restrikes at the opposite sign, this being the ideal current and further decrease of the rheostat resistance will finally result in equal pulse alternating current as indicated at "C" in Fig. 2 to obtain neutral polarity when desired.

Figure 6:
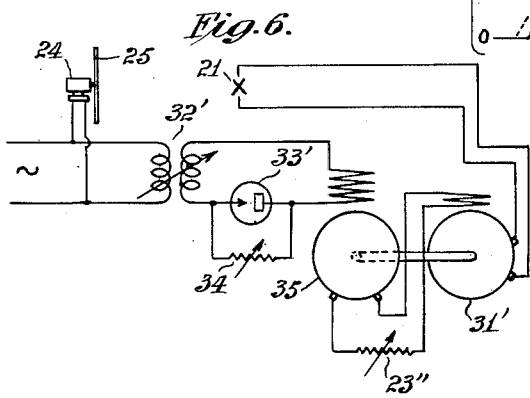
Fig. 6 represents diagrammatically a suggested arrangement in connection with the method of Fig. 5 when used with a separately excited welding generator.

Fig. 6 represents the same feature as Fig. 4 except that the variably rectified alternating current is applied to the exciter of the generator. Thus the variable transformer 32' and the rectifier 33' bridged by the rheostat 34 create currents as in Fig. 2 to produce similar currents in the welding generator output. The rheostat 23" controls the amperage of the welding arc.

Figure 7:
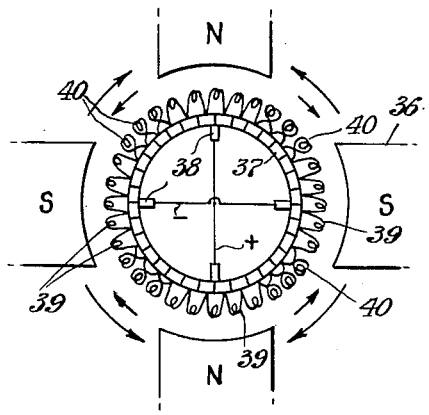
Fig. 7 is a schematic drawing of the interior of a welding generator representing a modification of the invention wherein the result is secured by reversing the connections of certain of the armature coils of the welding generator to the commutator segments.

Figure 7 illustrates a modification wherein the pulsating current is produced by reversing certain armature coils in a direct current welding generator. The armature coils 39 connect to the insulated segments of the commutator 37. The armature rotating in the flux of the field magnets of generator 36 normally cause a voltage whose direction as generated is shown by the larger outer arrows, this voltage appearing at the brush terminals as shown. Certain coils such as 40 are connected reversedly to their commutator segments so as to produce a voltage in an opposite direction to the remaining coils 39 as represented by the smaller inner arrows.

When the reversed coils are in the position where they produce their maximum voltage the normal coils will be at the position where they produce minimum voltage and the numerical proportion of the two groups of coils may be such that the current may be at or near zero in such periods to produce a welding current of unidirectional pulses as described. If the generator is separately excited so that the field is uniform, it is possible to increase the proportion of the reversed coils to a point where the current produced will contain a certain amount of alternating current component such as the current indicated at "B" of Fig. 1 or Fig. 2 and possess the advantages that have been described in that connection.

Figure 8:
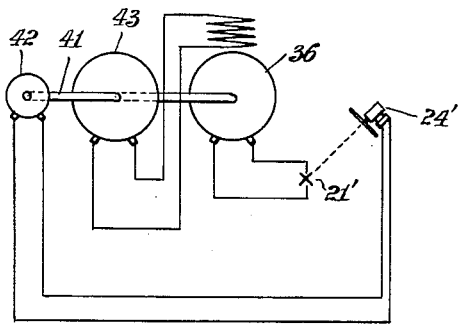
Fig. 8 is a diagram representing the entire welding apparatus and connections in use with the welding generator as converted according to Fig. 7.

To use the synchronizing shutter with the foregoing generator, the arrangement illustrated in Fig. 8 is suggested wherein a small generator 42 is coupled with the main shaft 41 on which is mounted the main generator 36, a motor and an exciter 43 if one is used. The generator 42 then is bound to drive the motor 24' in synchronism with the effect of the reversed coils 40 on the welding arc current so that the shutter may expose the view when the arc current is at minimum. The generator 42 may be of a two-phase or three-phase type and the motor 24' of a corresponding type to cooperate therewith.

Figure 9:
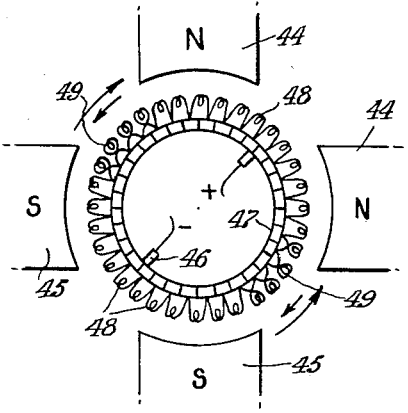
Fig. 9 represents schematically the method of Fig. 7 as applied to a certain type of welding generator having automatic voltage control.

When the welding generator is of a type where the polarity of the field poles is grouped as shown in Fig. 9, as with a certain type of automatic voltage control generator in general use, it is necessary to have only two groups of reversed coils such as 49 instead of four groups as in Fig. 7, and that they each occupy a correspondingly larger arc of the armature or commutator. It will be seen that poles 44 and poles 45 may each be considered a pole and the machine normally a two-pole generator so that the reversed coils will act to produce two minimum arc periods per revolution of the armature.

Figure 10:
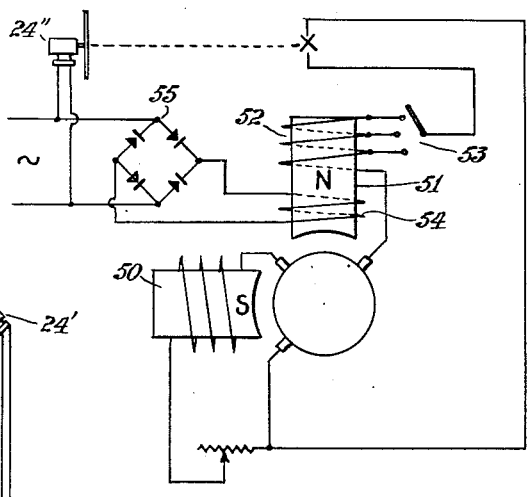
Fig. 10 is a diagram representing a welding system including the generator of Fig. 9.

Fig. 10 illustrates a modified method of applying the invention to the type of welding generator of Fig. 9. Two of the poles are removed for the sake of simplicity. The pole 50 is of the pair of poles that carries the shunt field while pole 51 is of the pair that carries a series field winding 52 that opposes the magnetism induced by a part of the winding of the shunt field thereon so that an increase in the conductivity of the output circuit as by shorting the welding arc reduces the voltage. The tap switch 53 regulates the amount of the neutralizing series field winding and consequently the amount of automatic voltage control. The winding 54 is ordinarily a part of the shunt field winding and gives the pole 51 a magnetic flux to boost the output. In this case, the winding 54 is transferred to a full wave rectifier 55 fed by the alternating current line and the direct pulsating current from the rectifier runs in a direction to assist the shunt field winding. However as each pulse wave goes to zero the effect of series winding 52 predominates and the polarity of pole 51 is reversed and the output voltage drops to zero. The effect may be intensified by having an additional winding on the pole 50 also fed by the rectifier 55 and wound to assist the shunt field so that the fall of the wave pulse will not only reverse polarity of pole 51 but also weaken pole 50.

Although several systems have been described it is evident that the result is the same and it is also evident that some of the systems or methods can be combined, as for example, a variable transformer such as 22 of Fig. 1 may be placed in the output circuit of the arrangements of Figs. 4, 6 and 10 to assist in producing the required effect.

I claim:

1. In an arc welding system, a generator for a welding arc, said generator having certain armature coils connected reversedly to the commutator whereby there is produced means for producing a current for said arc consisting of pulsations of alternating signs, the current of the pulsations of one sign being greater than the current of the pulsations of the opposite sign.

2. An arc welding generator having an armature, armature coils, a commutator, connections from the segments of the commutator to the armature coils, a section of the armature coils being reversed in their connection to the commutator segments whereby the output current of the generator is caused to have a pulsating character.

LEON DEWAN.

REFERENCES CITED

The following references are of record in the file of this patent:

UNITED STATES PATENTS

| Number | Name | Date |
|---|---|---|
| 461,297 | Van Depoele | Oct. 13, 1891 |
| 2,036,233 | Pakala | Apr. 7, 1936 |
| 2,139,160 | Hebeler | Dec. 6, 1938 |
| 2,173,450 | Larsen | Sept. 19, 1939 |
| 2,349,229 | Hebeler | Mar. 16, 1944 |